(12) United States Patent
Waggoner

(10) Patent No.: US 10,491,963 B1
(45) Date of Patent: Nov. 26, 2019

(54) USE VIDEO CODECS TO DELIVER IMAGES

(71) Applicant: Amazon Technologies, Inc., Seattle, WA (US)

(72) Inventor: Charles Benjamin Franklin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/195,814

(22) Filed: Jun. 28, 2016

(51) Int. Cl.
| H04N 21/6379 | (2011.01) |
| H04N 21/235 | (2011.01) |
| H04N 19/52 | (2014.01) |
| H04N 19/34 | (2014.01) |
| H04N 21/254 | (2011.01) |
| H04N 21/858 | (2011.01) |
| H04N 19/44 | (2014.01) |
| H04N 21/2343 | (2011.01) |
| H04N 19/177 | (2014.01) |

(52) U.S. Cl.
CPC ....... *H04N 21/6379* (2013.01); *H04N 19/177* (2014.11); *H04N 19/34* (2014.11); *H04N 19/44* (2014.11); *H04N 19/52* (2014.11); *H04N 21/2353* (2013.01); *H04N 21/234327* (2013.01); *H04N 21/2541* (2013.01); *H04N 21/8586* (2013.01)

(58) Field of Classification Search
CPC ........... H04N 21/6379; H04N 21/2353; H04N 21/2541; H04N 21/8586; H04N 21/234327
See application file for complete search history.

(56) References Cited

U.S. PATENT DOCUMENTS

| 6,185,625 B1 * | 2/2001 | Tso ................... G06F 17/30905 707/E17.121 |
| 2007/0074266 A1 * | 3/2007 | Raveendran ........... H04N 5/144 725/135 |
| 2008/0069457 A1 * | 3/2008 | Matsumoto .......... H04N 19/176 382/232 |
| 2010/0312643 A1 * | 12/2010 | Gil ......................... G06Q 30/02 705/14.55 |
| 2014/0115472 A1 * | 4/2014 | Mochinaga .......... G11B 27/034 715/719 |
| 2016/0156949 A1 * | 6/2016 | Hattori ........... H04N 21/234345 725/109 |
| 2016/0371468 A1 * | 12/2016 | Daniel .................... G06F 21/10 |

* cited by examiner

*Primary Examiner* — Yassin Alata
(74) *Attorney, Agent, or Firm* — Weaver Austin Villeneuve & Sampson LLP

(57) ABSTRACT

Techniques are described that enable digital images to be delivered using a video codec that operates according to a video encoding standard. These techniques include encoding digital images as frames of video content files, and decoding the frames of the video content files to display the images.

28 Claims, 7 Drawing Sheets

USE VIDEO CODECS TO DELIVER IMAGES

BACKGROUND

Before digital images can be stored or transmitted over a network, each digital image is encoded into an image format. A number of image formats for encoding digital images have been developed over the years.

Graphics Interchange Format (GIF) is an image format that was introduced in 1987. GIF images can be compressed without the loss of data using a lossless compression technique. However, the GIF format allows a palette of a maximum of 256 colors for each frame. Therefore, GIF is primarily used for the display of simple images and websites.

Joint Photographic Expert Group (JPEG) was subsequently introduced in 1992, and is one of the most commonly used formats for storing images. JPEG format is compatible with a majority of image processing applications on the market today. In addition, JPEG format is compatible with most hardware devices, making it easy to print images in JPEG format. Moreover, the size of JPEG images can be significantly reduced via lossy compression, making this file format suitable for transferring images over the Internet. Therefore, there are a number of advantages of the JPEG image format.

Another image file format that is commonly used is Portable Network Graphics (PNG). The first version of the PNG specification was released in 1996, and PNG subsequently became an International Standard in 2003. However, since PNG is a lossless file format, the transmission of an image stored in the PNG format will generally consume more bandwidth than an image stored in the JPEG format. Moreover, since PNG is a more recent file format, the support for PNG by older web browsers is limited. Therefore, JPEG remains the most popular format for transferring images over the Internet.

DETAILED DESCRIPTION

Figure 1:
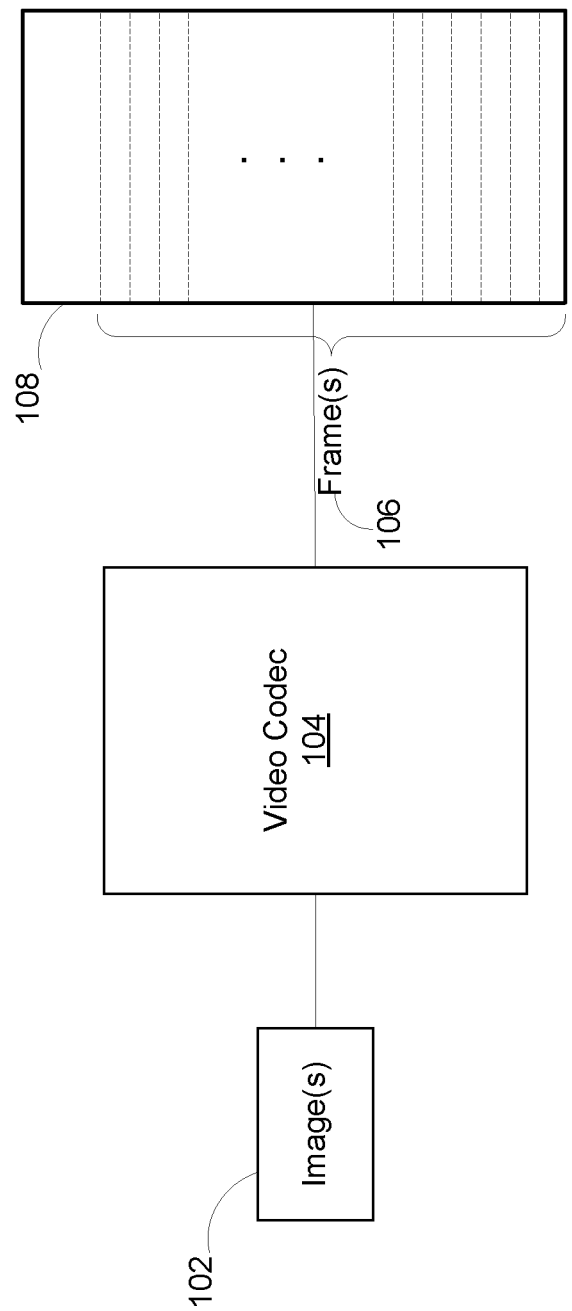
FIG. 1 is a simplified diagram illustrating a particular implementation.

This disclosure describes techniques that enable digital images to be delivered as frames that are encoded using video encoding formats. This is enabled by encoding images as frames of video files using video encoding standards such as Scalable Video Coding (SVC) or High Efficiency Video Coding (HEVC), which may also be referred to as H.264 or H.265, respectively. In contrast, conventional approaches transmit image files that have been encoded in image formats. By encoding images using video encoding standards, features that are conventionally applied to video streams can be advantageously applied to images to reduce the bandwidth typically consumed by digital images encoded in image formats.

While there are a number of advantages to the use of image file formats such as JPEG or PNG, there are limitations associated with each of the image file formats. Some of these limitations will be discussed below.

PNG was designed for transferring images on the Internet, not for professional-quality print graphics, and therefore does not support non-RGB color spaces such as CMYK. In addition, since the PNG file format is lossless, the size of the file cannot be reduced, making the PNG file format less suitable for transferring images over the Internet.

In contrast, since JPEG compression enables the size of an image file to be reduced, the JPEG format is widely used to transfer images over the Internet. However, JPEG compression is a method of lossy compression that results in the loss of content of the image. As a result, JPEG image compression is not suitable for images with sharp edges, lines, or text. Similarly, due to the loss of content, JPEG image format is not capable of handling animated graphic images, barcodes, or facial images used for facial recognition. Moreover, since JPEG format supports only 8 bit images, image quality is decreased if higher resolution images are stored in JPEG format.

One example of a scenario in which JPEG images are commonly transmitted over the Internet is an online media delivery system such as a video streaming service. To browse a catalog of video titles available from the service, a user may enter a search query to view those video titles that satisfy the search query. Alternatively, the user may select a particular category of video titles, as well as select among any sub-categories within a given category of video titles. For example, the user may choose to browse "Movies" that start with the letter "A" or "Television Shows" that are broadcast on "Monday." The service then provides the user a number of video titles from which a user can select a video title to stream from the video streaming service. Each of the video titles is typically represented by an image and identifies the specific video title. Since images representing multiple video titles are often displayed simultaneously within a grid or list, reduced-size versions associated with the video titles are often presented for display. These reduced-size versions are typically referred to as thumbnail images.

Due to the relatively large number of video titles that may be presented simultaneously for selection, the number of images files that are transmitted to a client device can be significant. To minimize the amount of memory consumed at the client device, the system typically transfers low resolution versions of the images to the client device. The lower resolution versions of the images are displayed by the client device; when the user chooses to zoom in on one of the images, an image file containing a higher resolution version of the image is transferred to the client device. Since the file containing the higher resolution version of an image is typically large in size and an image stored in an image format such as JPEG is typically decoded in software, the amount of central processing unit (CPU) resources of the client device that are consumed to decode the image can be substantial. As a result, a user deciding which movie to watch on a Saturday night may notice significant delays while browsing the online catalogue. Therefore, the transfer of image files over the Internet often results in a user experience that is sub-optimal.

In accordance with various implementations, a digital image is encoded as a frame of a video content file. To ensure that the digital image is displayed for an amount time that is appropriate for a given application, a frame duration can be specified in a header of the video content file. The image can subsequently be dynamically generated by decoding the frame of the video content file.

There are a number of video encoding standards that have been progressively developed over the years by the Moving Picture Experts Group (MPEG). MPEG-1 was developed in 1993, followed by MPEG-2 in 1995. While MPEG-1 was primarily designed to enable moving pictures and sound to be encoded onto a compact disc, MPEG-2 was much broader in scope.

MPEG-2 or H.262 is a standard of encoding of video using lossy compression methods. MPEG-2 enables movies to be transmitted and stored using various storage media. MPEG-2 encoder and decoder devices are widely available and inexpensive to produce. However, MPEG-2 streams can consume a significant amount of bandwidth.

Since the development of MPEG-2, a variety of compression techniques have been introduced. These techniques have been implemented in subsequent standards to reduce the amount of bandwidth consumed by video streams.

MPEG-4, which was released as an International Standard in 1999, incorporates a variety of new technologies that enable video streams to be processed more efficiently using less bandwidth than MPEG-2. For example, MPEG-4 achieves advances in compression efficiency by using fractal compression instead of the standard compression algorithms implemented by MPEG-2, such as discrete cosine transform (DCT). Moreover, the size of each macroblock is no longer fixed, enabling small macroblocks to be used where segments within an image are repeated or larger blocks to be encoded with fewer bits where information is repeated between successive frames. In addition, MPEG-4 allows B frames to be based on other B frames, reducing the use of P frames and lowering the overall bandwidth. Therefore, MPEG-4 enables video, text, and animation to be processed more efficiently.

While MPEG-4 has been available for a number of years, there has been no effort to use MPEG-4 or its successors to encode digital images. As a result, image formats such as JPEG continue to be used to store and transmit images over the Internet.

H.264 or MPEG-4 Part 10, also commonly referred to as Advanced Video Coding (AVC) is a block-oriented motion-compensation-based video compression standard. H.264 contains a number of features that enable video to be compressed more efficiently than older standards. Therefore, H.264 provides video at substantially lower bit rates than previous standards including MPEG-2.

H.265 or High Efficiency Video Coding (HEVC) is a successor to the H.264 video compression standard. While H.264 defines macroblocks up to 16×16 pixels, H.265 can describe macroblocks as large as 64×64 pixels. H.265 can provide the same advantages as H.264 by allowing a significant reduction in bit rate with the same or improved video quality.

In accordance with various implementations, digital images are encoded according to a video encoding standard such as H.264 or H.265. By encoding the digital images as frames of video content, features of a video encoding standard may be applied to transmit, store, or display images in a more efficient manner.

FIG. 1 is a simplified diagram illustrating the operation of a particular implementation. As shown in FIG. 1, digital image(s) 102 are encoded by video codec 104 as frame(s) 106 of a video content file(s) 108. Video codec 104 includes hardware that can encode digital images according to a video encoding standard such as H.264 or H.265. Digital image(s) 102 can subsequently be generated by decoding the frame(s) 106 using video codec 104 or another video codec operating according to the same encoding standard. More particularly, digital image(s) 102 can be generated by decoding corresponding frame(s) 106 of video content file(s) 108.

Figure 2:
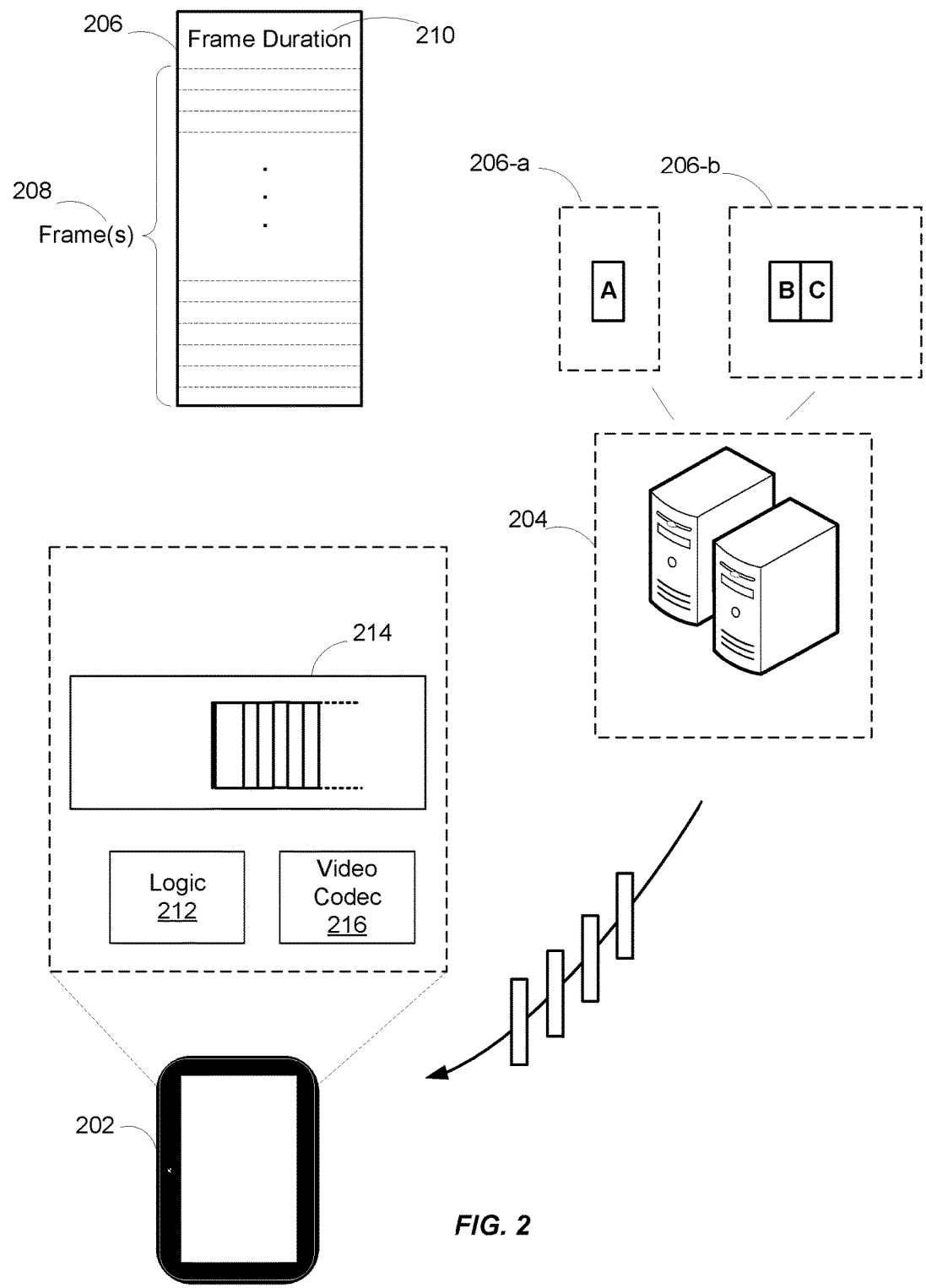
FIG. 2 illustrates the operation of an example of a particular implementation.

FIG. 2 illustrates the operation of an example of a particular implementation. In the example illustrated in FIG. 2, a user of client device 202 browses a catalogue of video titles available from video content service 204. When the user selects the category, "Movies" and the sub-category "Comedies" to view movie titles that are identified as comedies within content service 204, content service 204 queries its catalogue and identifies 53 movies that are comedies.

Content service 204 maintains files associated with the video titles available from content service 204 that enable images representing the video titles to be displayed at client devices using content service 204. In this example, content service 204 identifies a subset of the files that are relevant to the 53 movies. Each file 206 is a video file that includes one or more frames 208 that have been encoded by a video codec, as will be described in further detail below.

As shown in FIG. 2, each file 206 can include a header that indicates a frame duration 210 for frame(s) 208 of file 206. In this example, file 206-a corresponding to a first movie includes a single frame, "A"; file 206-b corresponding to a second movie includes two frames, "B" and "C." Where a file includes more than one frame as shown at 206-b, the frames can be encoded within a single fragment or separate fragments. In some implementations, file 206 includes only one fragment.

Each file 206 can conform to a digital multimedia container format such as MPEG-4 Part 14 or MP4. In one implementation, content service 204 provides identified file(s) by transmitting the identified file(s) to client device 202. In another implementation, content service 204 provides information pertaining to the fragments of the identified video files associated with the 53 movies to client device 202. For example, content service 204 may provide a web document, executable file, or a manifest file. The information may include metadata indicating how to access the fragments. For example, the metadata may indicate locations (e.g., URLs and/or byte offsets) at which the fragments can be accessed. The information may also indicate a format in which digital images generated from the frames of the video files are to be displayed. For example, a web document may indicate locations in which the digital images are to be displayed within a web page.

Client device 202 can use the information to retrieve the video fragments. The client device 202 may save the video fragments and/or other files received from content service 204 in memory 214 (or buffer).

A demultiplexer of client device 202 demultiplexes the frames and passes the frames to a decoder. In the implementation depicted in FIG. 2, the frames are passed to video codec 216. Video codec 216 decodes the frames to generate the corresponding digital images. Client device 202 may display the digital images according to the format indicated by content service 204. In addition, the digital images may be displayed according to a duration indicated by content service 204.

In this example, client device 202 decodes frame A of file 206-a using video codec 216 and displays the resulting digital image representing the first movie. Client device 202 then decodes frame B of file 206-b using video codec 216 to display a low quality digital image representing the second movie. If the user chooses to zoom in on the digital image representing the second movie, frame C of file 206-b representing a differential between the low quality digital image and a higher quality digital image is decoded by video codec 216 and used by client device 202 to display the higher quality digital image representing the second movie. In one implementation, each of the images is displayed for a time period according to duration 210 indicated in a header of corresponding video file 206.

While the example described above pertains to the rendering of images representing media content items such as movies or television episodes available from a media content service, these examples are merely illustrative. In other implementations, images representing other content items or products (e.g., photographs, artwork, jewelry, clothing) available from other types of services or web sites can also be rendered in a similar fashion.

Figure 3:
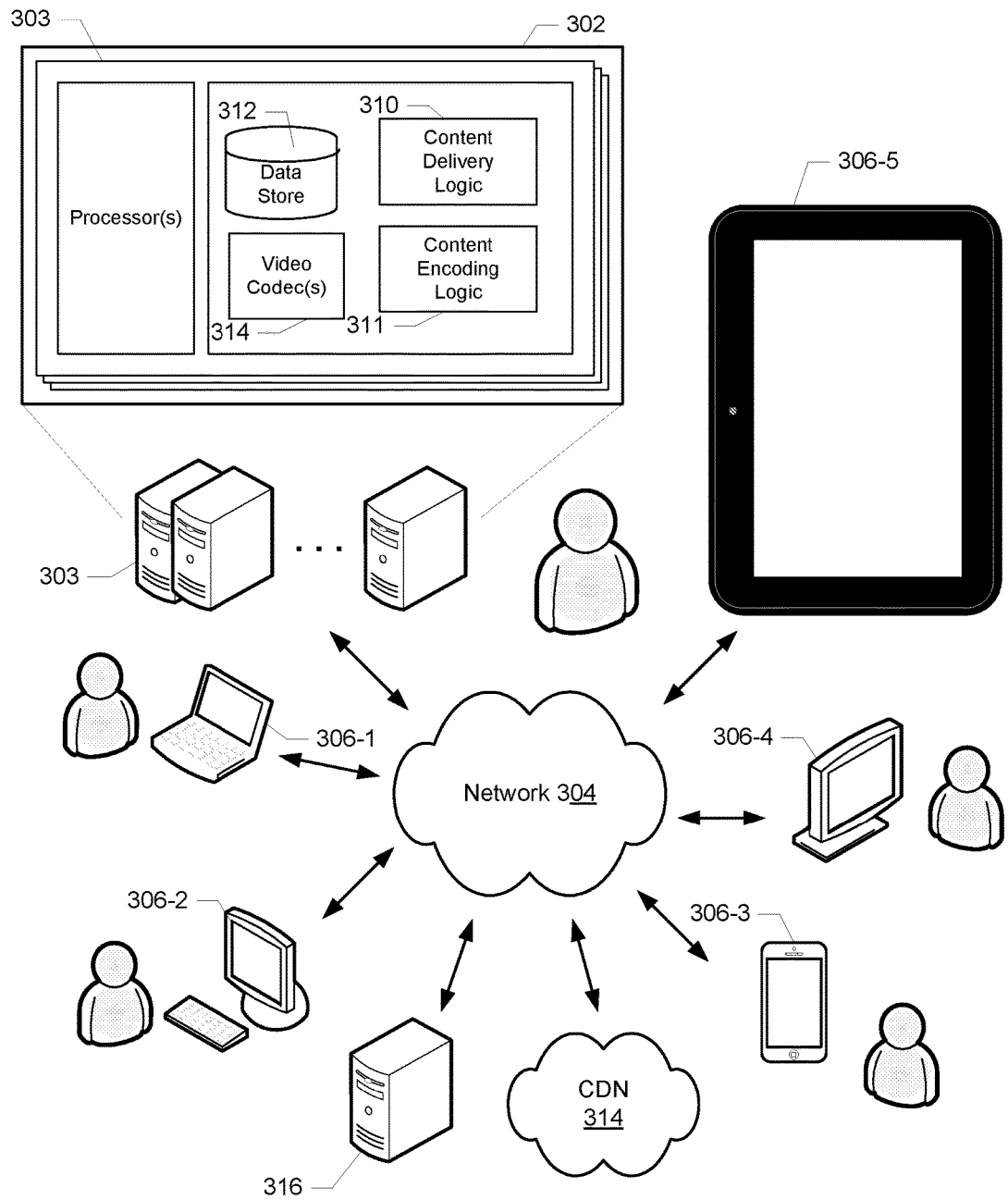
FIG. 3 is a simplified diagram of a computing environment in which various implementations may be practiced.

FIG. 3 illustrates an example of a computing environment in which a content service 302 such as a media content service provides content via network 304 to a variety of client devices (306-1 through 306-5) in accordance with the techniques described herein. In one implementation, the content may include media content such as video-on-demand (VOD) content (e.g., audio or video). In other implementations, the content enables digital images representing items such as photographs, artwork, or physical products (e.g., jewelry or clothing) that are available from content service 302 to be generated and displayed via the client devices.

Content service 302 includes content delivery logic 310 which facilitates various aspects of content delivery to client devices 306. Content service 302 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 306 may be any suitable device capable of connecting to network 304 and downloading or consuming streams of live and/or VOD content provided by service 302. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches or smart glasses), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling content service 302. Alternatively, such resources may be independent of content service 302, e.g., on a platform under control of a separate provider of computing resources with which content service 302 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 302 is described as if it were integrated with the platform(s) that provides the content to client devices. However, it will be understood that content service 302 may provide access to content in conjunction with one or more content delivery networks (e.g., CDN 314) that may or may not be independent of content service 302. In addition, the source of the content may or may not be independent of content service 302 (e.g., as represented by content provider server 316).

Implementations enabled by the present disclosure contemplate logic and video codec(s) resident on the client devices consuming content from content service 302; such logic and video codec(s) being configured to decode video files generated as described herein and display the resulting images. The logic might be part of an existing algorithm or module on the client device or implemented to work in conjunction with such an algorithm or module. The logic might be implemented, for example, in a media player on the client device, as a browser plug-in, or as a separate application or module resident on the client device. Implementations are also contemplated in which, in addition to content delivery logic 310 (which facilitates various aspects of content delivery to client devices 306), content service 302 may include logic that facilitates at least some aspects of the delivery of content as described herein (e.g., as represented by content encoding logic 311). For example, encoding logic 311 might encode digital images representing items such as media content titles according to a particular video encoding standard or multiple encoding standards. More particularly, encoding logic 311 can apply a video encoder(s), where each video encoder operates according to a different video encoding standard. Each video encoder can be implemented in software and/or hardware.

In this example, server 303 includes video codec(s) 314 that include hardware configured to encode digital images according to one or more encoding standards such as H.264 or H.265. Similarly, the video codec(s) can include hardware configured to decode digital images according to the respective encoding standards. Encoding digital images according to video encoding standards such as H.264 or H.265 can provide benefits with some implementations, as will be described below.

In one implementation, encoding logic 311 and/or video codec 314 is configured to encode an image or retrieve a video file generated as described herein based, at least in part, on encoding preferences of the client device. For example, encoding preferences may indicate preferences as to a target visual quality or bit rate, an amount of space available in a buffer or memory of the client device, a maximum amount of space available in the buffer or memory for storing the video file(s) or fragments, a number of images (or frames), a frame size, a target or maximum file size, a time period, and/or whether the images are to be encoded in the same fragment or separate fragments. Video codec(s) 314 may also be configured to encode metadata within the frames to further facilitate the decoding of the frames. For example, the metadata may indicate the image content type(s) of a corresponding image or region(s) thereof and/or characteristics of pixels within the image. Characteristics of pixels within a given image may include, for example, a level of entropy, a level of noise, a level of dithering, the brightest pixel within the image, and/or the average brightness of the pixels within the image.

In addition to providing access to content, content service 302 may also include a variety of information related to the content (e.g., associated metadata, web documents, manifests, and/or executable files) in data store 312 to which service 302 provides access. Alternatively, such information about the content, as well as the content itself may be provided and/or hosted by one or more separate platforms, e.g., CDN 314. It should be noted that, while logic 310 and 311, and data store 312 are shown as integrated with content service 302, implementations are contemplated in which some or all of these operate remotely from the associated content service, and/or are under the control of an independent entity. From these examples, those of skill in the art will understand the diversity of use cases to which the techniques described herein are applicable.

Figure 4:
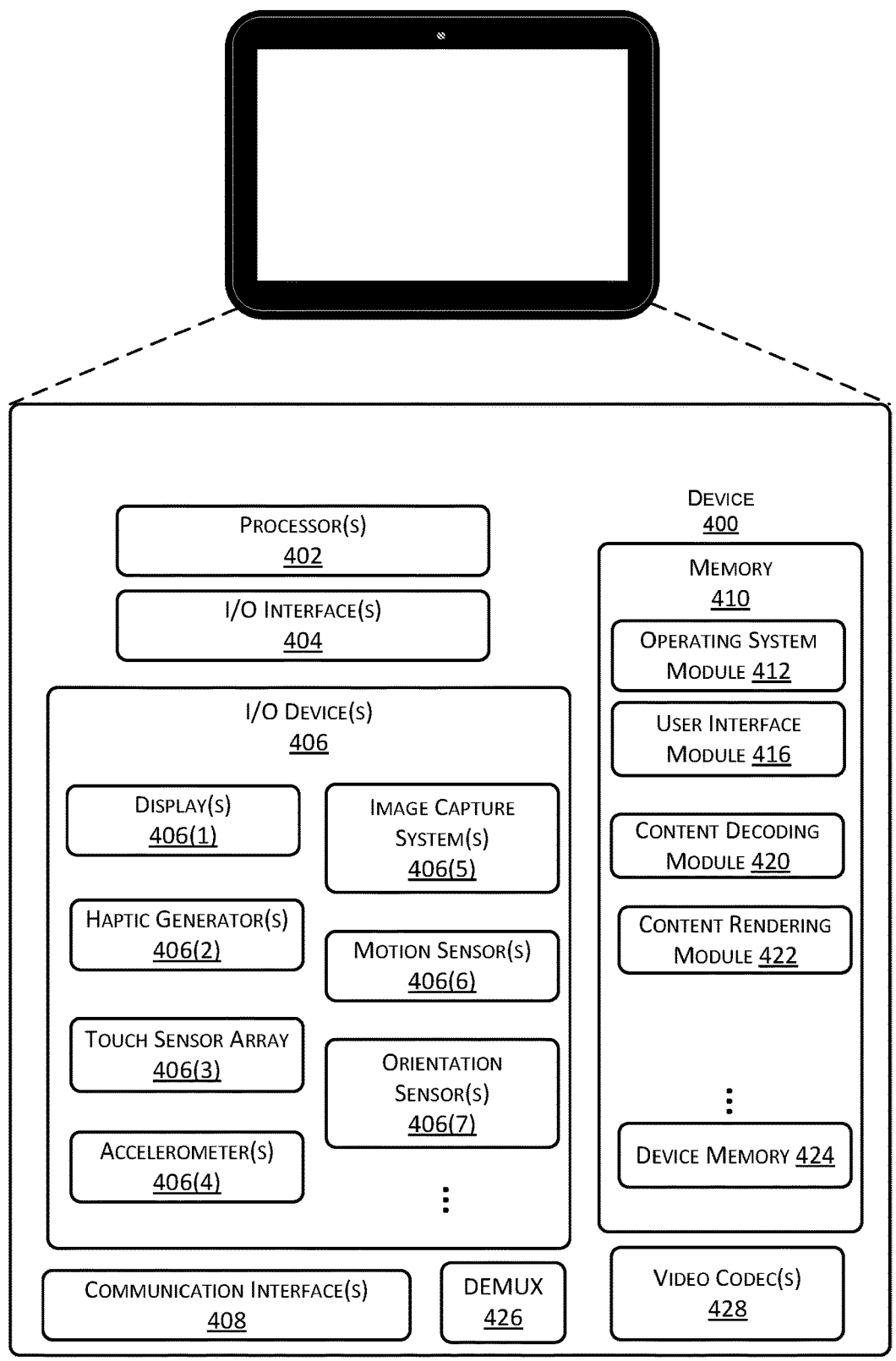
FIG. 4 is a simplified diagram of an example of a client device with which various implementations may be practiced.

A block diagram of an example of a client device 400 suitable for use with various implementations is shown in FIG. 4. Device 400 includes one or more single or multi-core processors 402 configured to execute stored instructions (e.g., in device memory 424). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-232 interface, a media device interface, and so forth. I/O interface(s) 404 is coupled to one or more I/O devices 406. The I/O device(s) 406 may include one or more displays 406(1), one or more haptic generators 406(2), a touch sensor array 406(3), one or more accelerometers 406(4), one or more image capture systems 406(5), one or more motion sensors 406(6), one or more orientation sensors 406(7), microphones, speakers, and so forth.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 also includes a user interface module 416, a content rendering module 422, and other modules.

A demultiplexer (DEMUX) 426 demultiplexes frames of fragments and passes the demultiplexed frames to a decoder for decoding. Each decoder may be implemented software and/or hardware.

Client device 400 can support a variety of video encoding standards. For some video encoding standards, decoding can be performed by a content decoding module 420. For other video encoding standards, decoding can be performed by a corresponding video codec 428 that includes hardware (e.g., electrical components or a circuit) configured to decode frames of video content files according to a corresponding video encoding standard such as H.264 or H.265. Similarly, video codec 428 can include hardware configured to encode frames according to a video encoding standard such as H.264 or H.265. Since frames can be decoded in hardware, the amount of CPU resources consumed to generate digital images is much lower than that consumed by software that is typically used to decode image files such as JPEG images.

Content rendering module 422 renders images that are generated as a result of decoding frames, as described herein. For example, content rendering module 422 may render images according to instructions in an executable file or a web document (e.g., a web page).

In one implementation, client device 400 is configured to communicate with the service regarding encoding preferences of client device 400. In another implementation, client device 400 is configured to use metadata of frames or fragments to facilitate the decoding of the frames, as will be described in further detail below.

Memory 410 also includes device memory 424 to store a wide variety of instructions and information using any of a variety of formats including, for example, flat files, databases, linked lists, trees, or other data structures. Such information includes content for rendering on display 406(1) including, for example, any type of video content (e.g., frames, fragments, or video files). In some implementations, a portion of device memory 424 may be distributed across one or more other devices including servers, network attached storage devices, and so forth.

The logic or computer program instructions used to support the decoding of frames of video files for the generation of digital images may be implemented in a variety of ways. For example, at least some of this functionality may be implemented as part of the code of a media player operating on device 400. Alternatively, content rendering module 422 may be implemented separately from and interact with the device's media player, web browser, mobile app, decoder, etc. The range of possibilities will be understood by those of skill in the art with reference to the following description.

It will also be understood that device 400 of FIG. 4 is merely an example of a device with which various implementations enabled by the present disclosure may be practiced, and that a wide variety of other devices types may also be used (e.g., as represented by devices 406-1 to 406-5). The scope of this disclosure should therefore not be limited by reference to device-specific details.

The following examples assume the use of either H.264 or H.265 encoding of digital images as video content. However, it will be understood that the basic principles described herein may be employed with any of a variety of video and audio codecs including, for example, VC-1, VP8, VP9, VP10, AV1, and Daala.

Figure 5:
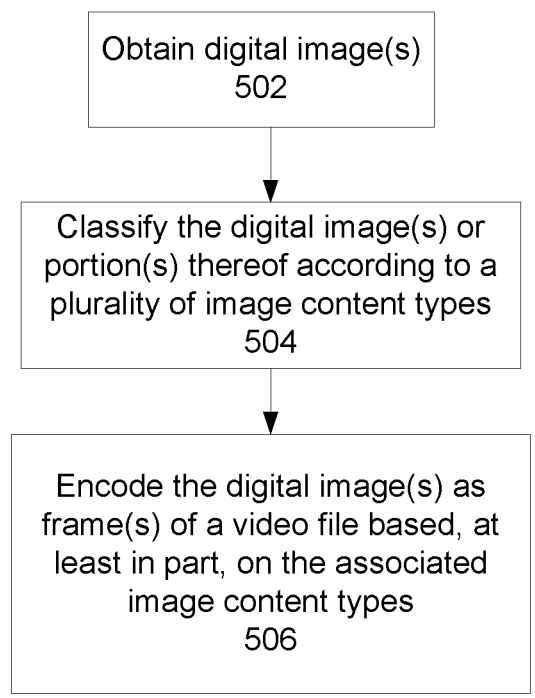
FIG. 5 is a flowchart illustrating encoding of digital images according to a particular implementation.

FIG. 5 is a flowchart illustrating encoding of digital images according to a particular implementation. One or more image files including one or more digital images are obtained (502). A video codec operating according to a video encoding standard may encode each of the digital images as a corresponding frame of a video content file. For example, the video codec can be a H.264 codec or a H.265 codec.

H.264 and H.265 provide a number of features that are typically used to encode videos. To leverage features of a video codec such as a H.264 or H.265 codec to encode the images, each of the digital images or portion(s) thereof may be classified as one or more image content types of a plurality of image content types (504). More particularly, metadata and/or content of an image or portion thereof may be used to identify the type of item (e.g., image content type) that is represented within the image or portion thereof. Example types of items include, but are not limited to, text, lines, graphics, barcodes, and/or facial images. Video codec may encode each of the digital images as a frame of a corresponding video file based, at least in part, on the associated image content types (506). For example, video codec may determine whether to encode an image or portion thereof using lossy or lossless compression based, at least in part, on the associated image content types. In one implementation, image content type(s) corresponding to the image or portion(s) thereof may also be indicated in metadata of the frame or fragment in which the frame is encoded.

In addition, pixels of a digital image may be analyzed to ascertain characteristics of the pixels within the image. For example, characteristics of pixels within a given image may include, for example, a level of entropy, a level of noise, a level of dithering, the brightest pixel within the image, and/or the average brightness of the pixels within the image or region thereof. Video codec may encode the image or region thereof based, at least in part, on the characteristics. For example, video codec may determine whether to encode the image or region thereof in a lossy or a lossless mode based, at least in part, on the characteristics. Characteristics of pixels within the image may also be indicated within metadata of the frame or associated fragment.

Features of video encoding standards such as H.264 and H.265 may be leveraged to encode digital images in an optimal manner. Examples of the application of these features to the encoding of digital images will be discussed in further detail below.

H.264 standardizes the encoding of a high-quality video bitstream that also contains one or more subset bitstreams. A subset video stream is derived by dropping packets from the video to reduce the bandwidth for the subset bitstream. The subset bitstream can represent a lower spatial resolution, a lower temporal resolution, or lower quality video signal.

In modern video transmission systems and storage systems, networks are characterized by different connection qualities. In addition, receiving devices have different capabilities, including different screen sizes and resolutions, as well as different processing power. H.264 was developed to accommodate the varying capabilities of end systems and devices, including different spatial formats, bit rates, or power. Therefore, H.264 enables the same video content to be streamed with different resolutions, qualities, and/or frame rates.

Both H.264 and H.265 support the use of differential coding, which is also commonly referred to as predictive coding. By using a differential coding technique, it is possible to reduce the redundancy of encoded data by encoding a differential between a signal and its prediction. Inter-frame prediction can be used to encode a differential between neighboring frames within a video. Similarly, intra-frame prediction can be used to encode a differential between two regions within the same frame.

In H.264, a video bitstream contains a base layer and one or more enhancement layers. Each enhancement layer is added to the base layer to further enhance the quality of encoded video. In spatial scalability, inter-layer prediction is used to remove redundancy across video layers. The resolution of the enhancement layer is equal to or greater than the lower layer. Enhancement layer predicted (P) frames can be predicted from a lower layer or from a previous frame in the same layer.

In accordance with various implementations, differential coding is performed to encode digital images rather than video. More particularly, it is possible to predict a higher resolution image from a lower resolution image to reduce the bit rate to code the higher resolution image. In one implementation, a lower resolution image is encoded in a first frame, while a differential between the lower resolution image and the higher resolution image is encoded in the second frame. For example, the lower resolution image may be encoded as an Intra-coded (I) frame, while the differential between the lower resolution image and the higher resolution image may be encoded as an enhancement layer frame. Through the use of differential coding, a high resolution image can be generated using significantly fewer bits than that of an image stored in an image format such as JPEG.

Each item available from a service such as a content service or a web site associated therewith may be represented by a digital image that is encoded as a frame of a corresponding video content file. In one implementation, each item is a video title available from an online media service. In other implementations, each item may be a digital media item such as a photograph, audio title (e.g., song or album), or online book. In yet other implementations, each item may be a physical item such as artwork, clothing, or jewelry.

An image may be encoded as a frame of a video file that consists of a single frame. In another implementation, each item has associated therewith a corresponding video content file that includes two frames. For example, the first frame may be an I frame that corresponds to a lower quality image, while the second frame may be an enhancement layer frame that corresponds to a differential between the lower quality image and a higher quality image. When a user chooses to zoom in on the lower quality image, the higher quality image can be rendered using the differential represented in the second frame, enabling the higher quality image to be transmitted and stored using fewer bits.

In some instances, multiple digital images may be encoded as frames of a single video content file. For example, a comic book having 26 pages may be encoded as 26 frames of the video content file. Where two or more digital images are encoded as frames of a video content file, the digital images can be encoded within a single fragment or multiple fragments. For example, a fragment can consist of a single IDR frame. As another example, a fragment can include a coded video sequence, where the first frame is an IDR frame. Subsequent frame(s) within the fragment can include an enhancement layer frame or an intra-coded picture (i frame). Therefore, each fragment of the video content file can include a single frame or multiple frames.

Since H.264 and H.265 offer both a lossless compression mode and a lossy compression mode, it is possible to create lossless-coded regions within lossy-coded images. More particularly, the lossy compression mode can be used to reduce the number of total bits used to encode an image, while the lossless compression mode can be used to retain finer details of the image that can be significant to a viewer. For example, where the image includes text identifying a movie title, the details of the background image may be insignificant in relation to the title. As another example, where the image includes a barcode, the regions of the image surrounding the barcode will generally not contain information that will be read by barcode readers.

In one implementation, a first portion (e.g., macroblock (s)) of an image is compressed using lossy compression, while a second portion (e.g., macroblock(s)) of the image is compressed using lossless compression. For example, the second portion may include a facial image, barcode, text, lines, or graphics.

In another implementation, an entire image is compressed using lossless compression. While lossless compression results in a larger file than that generated using lossy compression, the resulting file is smaller than an image stored in an image format such as PNG.

In addition, encoding parameters such as quantization parameters may be adjusted to regulate the amount of spatial detail that is saved. More particularly, quantization parameters may be adjusted for a given fragment, frame, or portion of a frame.

The disclosed embodiments may also be applied to encode a high dynamic range (HDR) image. A HDR image typically includes two or more photographs of the same scene, each taken at a different shutter speed. Similarly, the video file may be a HDR video. H.265 supports HDR by enabling a wide range of luminance values to be represented. In one embodiment, pixel characteristics such as the brightest pixel within an image or average brightness of pixels within the image are encoded within a frame.

A frame duration can also be specified in a header of the video content file. By specifying a frame duration, it is possible to ensure that each image is displayed for a time that is suitable for a given application. For example, where the image is a preview of a photograph taken by a professional photographer, it may be desirable to specify a frame duration that is long enough to enable a user to view a preview of the image, but not significant enough to enable the user to capture the image via a camera. As another example, where the image represents a video title available from an online media service, it may be desirable to specify a duration of several minutes to ensure that multiple titles can be displayed simultaneously for a period of time that is sufficient to enable a user to select one of the titles.

Digital images encoded within frames of the video content file may be protected via a variety of mechanisms. For example, a digital rights management (DRM) system may require a user to have a DRM license to access content of the video file. Where the video file is protected by a digital rights management (DRM) system, the video file can include a uniform resource locator (URL) of a web page where a user can acquire a license to access the content of the video content file. In addition, a header of the video file may include information that enables a media player to decrypt the frames of the video file so that they can be decoded by a video codec. In one implementation, the video file conforms to a multimedia container file format such as MPEG-4 (MP4).

A video file generated as described herein may be accessed via various mechanisms including, but not limited to, a text message or URL. A video file stored in a media format such as MP4 may be delivered as a single file or as a stream. More particularly, information including metadata enabling fragments of the video file to be acquired can be provided via a manifest, a web document, an executable file, or other suitable mechanism, enabling a web browser or application on the client device to retrieve the fragments. An example of the delivery of encoded digital images over a network will be described in further detail below.

Figure 6:
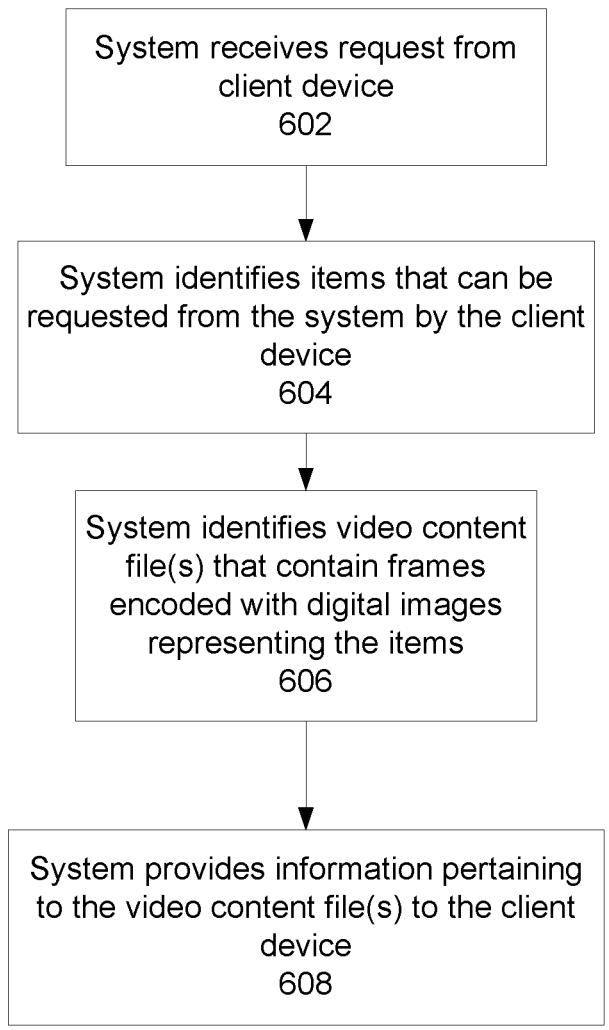
FIG. 6 is a flowchart illustrating delivery of encoded digital images to a client device according to a particular implementation.

The delivery of encoded digital images to a client device according to a particular implementation is illustrated in the flow chart of FIG. 6. A user may connect with a system offering a service such as a content service (or associated web site) via the Internet using a client device and browse a catalogue of items offered by the service. In one implementation, the service is a media content service offering media items such as video titles. Server(s) associated with the system may identify a plurality of selectable items to present to the user. The items may be selected based upon various criteria such as a prior viewing history of the user, selection by the user of a category via a user interface presented at the client device, and/or a search query submitted by the user.

Access to content over the Internet is typically governed by a digital rights management system such as Google's Widevine, Microsoft's PlayReady, Apple's FairPlay, or Sony's OpenMG to name a few representative examples. Content may be encrypted using any of a variety of encryption technologies including, for example, various Advanced Encryption Standard (AES) and Elliptic Curve Cryptography (ECC) encryption techniques. The content may also be delivered using an adaptive bit rate streaming technique such as, for example, MPEG-DASH (Dynamic Adaptive Streaming over HTTP), Apple's HLS (HTTP Live Streaming), or Microsoft's Smooth Streaming, to name a few representative examples. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

Referring now to FIG. 6, the user connects to the system by completing a login process using the client device and the system receives a request from the client device (602). In one implementation, the request indicates encoding preferences such as a number of frames. For example, the client device may request 50 frames to initiate a user interface.

The system may identify a plurality of items that may be requested from the service by the client device (604). The system may identify one or more video content files that contain frames encoded with digital images representative of the items (606). The system may generate, retrieve, access, or encode the video content files based, at least in part, on parameters of the request received from the client device. For example, where the parameters of the request indicate encoding preferences such as a number of frames, the system may generate a file that includes the requested number of frames in response to the request. As another example, where the parameters of the request indicate encoding preference(s) such as a bit rate and/or maximum file size, the system may retrieve, access, or encode the video content files according to the encoding preference(s) of the client device.

The system provides the client device with information the client device can use to acquire the fragments (also referred to as a group of pictures or GOP) of the video content file(s) that include the frames (608). The information can also indicate a format in which thumbnail images associated with the video content file(s) are to be displayed. More particularly, the format may associate various locations within a screen or web page with specific fragments or frames of the video content file(s). For example, the information can include a manifest, a web document, a uniform resource locator (URL) associated with the video content files, or an executable file. In addition, the system may provide the client device with additional information such as DRM licenses and/or a decryption key.

Figure 7:
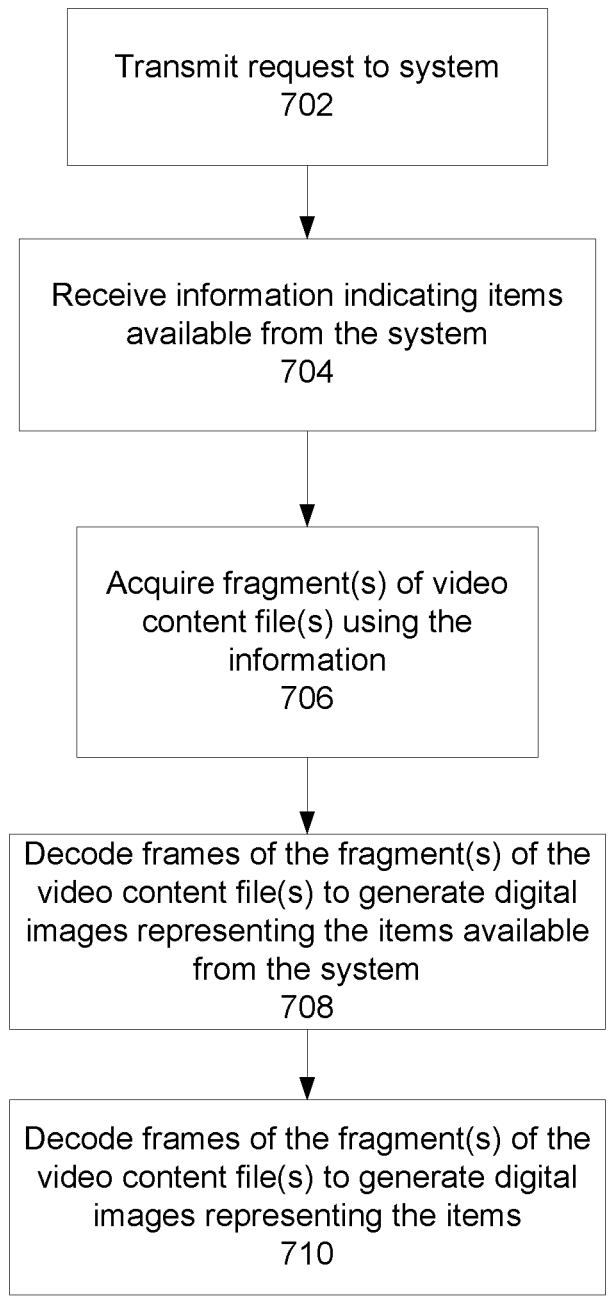
FIG. 7 is a flowchart illustrating the generation of digital images at a client device according to a particular implementation.

FIG. 7 is a flowchart illustrating the generation of digital images at a client device according to a particular implementation. As described above, a user may login to a system offering a service such as a content service. The user may query the system to ascertain items available from the system by selecting a category and/or submitting search term(s). Alternatively, the user may rely on the system to suggest suitable items. For example, the items can include media content items or other products. In one implementation, the client device transmits an indication of one or more encoding preferences to the system. More particularly, the encoding preferences may indicate preferences of the client device in relation to fragments of video file(s) that the system will make available to the client device. The preferences may indicate preferred encoding parameters for encoding the images that will be generated and displayed at the client device. For example, the encoding preferences may indicate an amount of space available in a buffer or memory of the client device, a maximum amount of space available in the buffer or memory for storing the video file(s) or fragments, a time preference, a number of images the client device is requesting, and/or whether the images are to be encoded in the same fragment or separate fragments.

After the client device transmits a request to the system (702), the client receives information from the system that indicates items that are available from service (704). In one embodiment, the system provides a media content service and the client receives information from the media content service that indicates media content item(s) that are available from the media content service. The information may include metadata that the device can use to acquire fragment(s) of video content file(s). In addition, the information may indicate a format in which digital images representing the items are to be displayed by the client. As described above, the information may indicate locations, within a display or web page, at which digital images corresponding to specific fragments or frames of the video content file(s) are to be displayed by the client device. For example, the information may indicate that the images are to be displayed within a grid according to alphabetical order.

The client device can initiate acquiring fragment(s) of the video content file(s) using the information received from the system (706). The client device may store the fragments as they are acquired. Since RGB images consume a significant amount of memory, the number of RGB images such as PNG images that can be stored by the client device is limited. However, YUV frames of video file encoded by a video codec consume less memory, enabling a greater number of images to be stored.

For each fragment, the client device may use the fragment's index to determine the frames of the fragment, the reference hierarchy (e.g., representing the dependencies between or among frames), and the offset of each frame in the fragment. For example, the index may be in the Movie Fragment ("moof") box of a media container file based on the ISO Base Media File Format, e.g., a the Common File Format (CFF) file, a Common Media Format (CMF) file, or an MP4 format file. As will be appreciated, these are merely examples of file types that may be used with implementations enabled by the present disclosure.

A demultiplexer of the client device passes frames of the fragments of the video content file(s) to a video decoder of the client device. In one implementation, the video decoder is a video codec configured to decode frames that have been encoded according to the H.264 or H.265 video encoding standard (e.g., the same standard used to encode the frames).

The video codec decodes frames of the fragments of the video content file(s) (708), and the client device displays digital images generated as a result of decoding the frames (710). While the decoding of the frames (708) and display of the images (710) are shown in FIG. 7 as being performed as separate sequential processes, this may be an iterative process performed for each of the frames.

In one implementation, metadata associated with each of the frames may be used by the video codec to decode the corresponding frame. For example, the metadata may indicate the image content types of items represented within the corresponding image or region(s) therein. As another example, the metadata may indicate characteristics of pixels within the image or region(s) within the image. The metadata associated with a frame may be encoded in the frame or may be encoded in the fragment containing the frame.

The digital images may be displayed within a screen or web page according to a format indicated by the system. More particularly, the client device may ascertain, from the information received from the service, a format in which digital images representing the items are to be displayed. For example, a web browser of the client device may display a web page including thumbnail images representing the digital images. The client device may display the digital images according to a duration indicated in a header of the video content file(s) such that the digital images are presented within the web page. The digital images may be downloaded in parallel via multiple separate threads or sequentially.

In one implementation, the digital images are low resolution images. If a user chooses to zoom in on one of the images representing a particular item, the client device may send a second request to the content service to display a high resolution image representing the same item. The system provides the client device access to an enhancement layer (e.g., an enhancement layer frame) representing a differential between the low resolution image and the high resolution image. For example, the system may provide second information including metadata pertaining to the enhancement layer (e.g., identifying the fragment and/or frame within the fragment) to the client device. Where the client device has not previously downloaded the fragment that includes the enhancement layer frame that represents the differential between the low resolution image and the high resolution image, the client device downloads the fragment including the enhancement layer frame. The video codec decodes the enhancement layer frame to generate the high resolution image from the low resolution image. Since the enhancement layer frame consumes fewer bits than an image file representing the high resolution image, the service may enable users to zoom in on thumbnail images more efficiently while also consuming less memory at the client device.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
    obtaining, by one or more servers, a plurality of digital images representing media content items available from a media content service, each of the plurality of digital images including a title representing a corresponding one of the media content items, a first subset of the digital images being low resolution images representing the media content items and a second subset of the digital images being high resolution images representing the media content items;
    for each digital image of the plurality of digital images, classifying the digital image or portion thereof as one or more image content types of a plurality of image content types;
    encoding, by a video codec of the servers, the plurality of digital images such that each digital image of the plurality of digital images is represented by a corresponding frame contained within a corresponding fragment of a corresponding video content file of one or more video content files, wherein encoding the digital images is performed based, at least in part, on the image content types associated with the corresponding digital image of the plurality of digital images or portion thereof, wherein the video codec is a H.264 codec or a H.265 codec, wherein encoding the digital images includes:
        encoding, by the video codec, a first image of the first subset of the digital images as a first frame of the video content files, the first image being a low resolution image representing one of the media content items;
        ascertaining, by the video codec, a differential between the first image and a second image of the second subset of the digital images, the second image being a high resolution image representing the media content item; and
        encoding, by the video codec, the differential between the first image and the second image as a second frame of the video content files such that the second frame represents the second image, the second frame being an enhancement layer frame;
    specifying, by the servers, a frame duration in a header of each of the video content files, the frame duration indicating a time period for which each individual digital image of the first subset of the plurality of digital images, encoded in a corresponding frame within the video content file, is to be displayed;
    receiving, by the servers, a request from a client device; and
    responsive to processing the request, providing, by the servers to the client device, information including metadata indicating locations of fragments of the video content files, the information indicating a format in which the first subset of the plurality of images generated from the corresponding frames of the video content files are to be displayed, within a web page, for the frame duration.

2. The method as recited in claim 1,
    the first frame being an I frame.

3. The method as recited in claim 1, further comprising;
    receiving, by the servers, a request from the client device in association with the first image; and
    in response to receiving the request, facilitating, by the servers, access to the second frame.

4. The method as recited in claim 1, wherein encoding the digital images comprises:
    encoding, by the video codec, a first portion of one of the digital images using lossy compression; and
    encoding, by the video codec, a second portion of the digital image using lossless compression;
    wherein the second portion of the digital image includes text, lines, or graphics.

5. The method as recited in claim 1, wherein encoding the digital images such that each of the digital images is encoded as a corresponding frame contained within a corresponding fragment of a corresponding video content file of one or more video content files based, at least in part, on the image content types associated with each of the digital images comprises:
    for each digital image of the first subset of the digital images, determining whether to use lossy compression to encode the digital image or portion thereof based, at least in part, the image content types associated with the digital image or portion thereof.

6. The method as recited in claim 1, wherein for each of the digital images, classifying the digital image or portion thereof as one or more image content types of a plurality of image content types comprises:
    classifying a first portion of one of the digital images as a first image type of the plurality of image content types; and
    classifying a second portion of the one of the digital images as a second image type of the plurality of image content types.

7. The method as recited in claim 1, the plurality of content types comprising one or more of: text, lines, graphics, a barcode, or a facial image.

8. A method, comprising:
    obtaining one or more image files including two or more digital images, a first subset of the digital images being low resolution images representing media content items available from a media content service and a second subset of the digital images being high resolution images representing the media content items;
    for each of the digital images, classifying the digital image or portion thereof as one or more image content types of a plurality of image content types;
    encoding, by a video codec, the digital images according to a video encoding standard based, at least in part, upon the image content types for each of the digital images, wherein the digital images are encoded such that each of the digital images is represented by a corresponding one of two or more frames within a corresponding one of one or more fragments of at least one video content file, wherein encoding the digital images includes:
encoding, by the video codec, a first image of the first subset of the digital images as a first frame of the video content file, the first image being a low resolution image representing one of the media content items;
ascertaining, by the video codec, a differential between the first image and a second image of the second subset of the digital images, the second image being a high resolution image representing the media content item; and
encoding, by the video codec, the differential between the first image and the second image as a second frame of the video content file such that the second frame represents the second image, the second frame being an enhancement layer frame;
specifying a frame duration in a header of the video content file, the frame duration indicating a time period for which each individual digital image of the first subset of the digital images, encoded in a corresponding frame within the video content file, is to be displayed; and
providing information indicating a format in which the first subset of the plurality of images generated from the corresponding frames of the video content file are to be displayed, within a web page, for the frame duration.

9. The method as recited in claim 8, further comprising:
encrypting the frames using an encryption mechanism;
providing decryption information in a header of the video content file, where the decryption information enables the frames to be decrypted; and
providing a uniform resource locator (URL) in the video content file, wherein the URL enables a digital rights management (DRM) license to be acquired.

10. The method as recited in claim 8,
the first frame being an I frame.

11. The method as recited in claim 8, wherein the digital images comprise two or more digital images, wherein encoding the digital images comprises:
encoding a particular one of the digital images as a frame of a first one of the fragments of the video content file; and
encoding another one of the digital images as a frame of a second one of the fragments of the video content file.

12. The method as recited in claim 8, wherein the digital images comprise two or more digital images, wherein encoding the digital images comprises:
encoding a particular one of the digital images as a frame of one of the fragments of the video content file; and
encoding another one of the digital images as another frame of the fragment of the video content file.

13. The method as recited in claim 8, wherein encoding the digital images comprises:
encoding a first portion of one of the digital images using a lossless compression mode; and
encoding a second portion of the digital image using a lossy compression mode.

14. The method as recited in claim 8, wherein encoding the digital images comprises:
encoding the first image using a lossless compression mode.

15. The method as recited in claim 8, wherein encoding the digital images comprises:
adjusting one or more encoding parameters, the encoding parameters including one or more quantization parameters.

16. The method as recited in claim 8, further comprising:
for each of the first subset of the digital images, analyzing pixels of the digital image to ascertain pixel characteristics;
wherein encoding the first subset of the digital images includes encoding, for each of the first subset of the digital images, the pixel characteristics of the digital image within a corresponding one of the fragments of one of the video content files.

17. The method as recited in claim 8, wherein the video encoding standard is H.264 or H.265.

18. The method as recited in claim 8, further comprising:
transmitting the video content file or information indicating how to access the fragments of the video content file.

19. The method as recited in claim 17, further comprising:
receiving a request from a client device indicating one or more encoding preferences;
wherein the video content file corresponds to the encoding preferences.

20. The method as recited in claim 8, the frame duration specifying the time period for which each individual digital image of the plurality of digital images, encoded in a corresponding frame within the video content file, is to be displayed.

21. A system, comprising:
one or more processors and memory configured to:
obtain one or more image files including two or more digital images a first subset of the digital images being low resolution images representing media content items available from a media content service and a second subset of the digital images being high resolution images representing the media content items; and
for each of the digital images, classify the digital image or portion thereof as one or more image content types of a plurality of image content types; and
a video codec configured to encode the digital images according to a video encoding standard based, at least in part, upon the image content types for each of the digital images, wherein the digital images are encoded such that each of the digital images is represented by a corresponding one of two or more frames within a corresponding one of one or more fragments of at least one video content file, wherein the video codec is configured to:
encode a first image of the first subset of the digital images as a first frame of the video content file, the first image being a low resolution image representing one of the media content items;
ascertain a differential between the first image and a second image of the second subset of the digital images, the second image being a high resolution image representing the media content item; and
encode the differential between the first image and the second image as a second frame of the video content file such that the second frame represents the second image, the second frame being an enhancement layer frame;
the processors and memory being further configured to:
specify a frame duration in a header of the video content file, the frame duration indicating a time period for which each individual digital image of the first subset of digital images, encoded in a corresponding frame within the video content file, is to be displayed; and provide information indicating a format in which the first subset of the plurality of images generated from the corresponding frames of the video content file are to be displayed, within a web page, for the frame duration.

22. The system as recited in claim 21, the processors and memory being further configured to:

encrypt the frames using an encryption mechanism;

provide decryption information in a header of the video content file, where the decryption information enables the frames to be decrypted; and provide a uniform resource locator (URL) in the video content file, wherein the URL enables a digital rights management (DRM) license to be acquired.

23. The system as recited in claim 21, the first frame being an I frame.

24. The system as recited in claim 21, wherein the digital images comprise two or more digital images, the video codec being further configured to:

encode a particular one of the digital images as a frame of a first one of the fragments of the video content file; and encode a another one of the digital images as a frame of another one of the fragments of the video content file.

25. The system as recited in claim 21, wherein the digital images comprise two or more digital images, the video codec being further configured to:

encode a particular one of the digital images as a frame of one of the fragments of the video content file; and encode another one of the digital images as a corresponding frame of the fragment of the video content file.

26. The system as recited in claim 21, the video codec being further configured to:

encode a first portion of a digital image of the first subset of the digital images using a lossless compression mode; and encode a second portion of the digital image using a lossy compression mode.

27. The system as recited in claim 21, the video codec being further configured to:

encode a digital image of the first subset of the digital images using a lossless compression mode.

28. The system as recited in claim 21, the video codec being further configured to:

adjust one or more encoding parameters, the encoding parameters including one or more quantization parameters.

* * * * *